(12) United States Patent
Lin

(10) Patent No.: US 10,874,221 B1
(45) Date of Patent: Dec. 29, 2020

(54) HEAD AND NECK ADJUSTING DEVICE FOR CHAIR

(71) Applicant: Iou Jia Industrial Co., Ltd., Kaohsiung (TW)

(72) Inventor: Yu-Jen Lin, Kaohsiung (TW)

(73) Assignee: Iou Jia Industrial Co., Ltd., Kaohsiung (TW)

( * ) Notice: Subject to any disclaimer, the term of this patent is extended or adjusted under 35 U.S.C. 154(b) by 49 days.

(21) Appl. No.: 16/454,144

(22) Filed: Jun. 27, 2019

(51) Int. Cl.
*A47C 7/38* (2006.01)
*F16C 11/10* (2006.01)

(52) U.S. Cl.
CPC ............ *A47C 7/383* (2013.01); *F16C 11/103* (2013.01)

(58) Field of Classification Search
CPC .. A47C 7/383; A47C 7/38; A47C 7/36; F16C 11/103; B60N 2/806; A61G 5/121; A61G 15/125
USPC ....... 297/391, 397, 399, 400, 408, 410, 353, 297/411.36, 405
See application file for complete search history.

(56) References Cited

U.S. PATENT DOCUMENTS

| | | | | |
|---|---|---|---|---|
| 3,730,589 A * | 5/1973 | Lane | ...................... | A61G 5/121 297/391 |
| 3,885,831 A * | 5/1975 | Rasmussen | .......... | A61G 15/125 297/410 |
| 7,690,729 B2 * | 4/2010 | Liao | ......................... | A47C 7/38 297/408 |
| 2004/0046435 A1 * | 3/2004 | Bonn | ....................... | A47C 7/38 297/409 |
| 2007/0085401 A1 * | 4/2007 | Hunziker | ................. | A61G 5/12 297/410 |
| 2016/0150885 A1 * | 6/2016 | Peterson | ................ | A47C 1/023 297/408 |
| 2017/0224117 A1 * | 8/2017 | DuFresne | .............. | A61G 5/121 |

* cited by examiner

*Primary Examiner* — Mark R Wendell
(74) *Attorney, Agent, or Firm* — Alan D. Kamrath; Karin L. Williams; Mayer & Williams PC

(57) ABSTRACT

A head/neck adjusting device includes a base, a clamping member, a holder, an adjusting and fastening knob, a plurality of locking members, and a head/neck support. The clamping member is clamped on a backrest of a chair. The holder includes a linear adjusting member inserted through the base, and an angle adjusting member connected with the linear adjusting member. The adjusting and fastening knob extends through the base and the linear adjusting member. Each of the locking members is mounted on the angle adjusting member and provided with a positioning projection. The head/neck support is provided with a plurality of support posts extending through the locking members. Each of the support posts is provided with a plurality of positioning holes, and the positioning projection of each of the locking members is positioned in one of the positioning holes.

7 Claims, 6 Drawing Sheets

HEAD AND NECK ADJUSTING DEVICE FOR CHAIR

BACKGROUND OF THE INVENTION

1. Field of the Invention

The present invention relates to an adjusting device and, more particularly, to a head and neck (or occiput) adjusting device for a chair, such as an office chair or the like.

2. Description of the Related Art

A conventional office chair comprises a backrest to support a user's back. The backrest has a top that may be provided with a headrest to support the user's head and neck. The headrest may have an angle adjusting function. However, the headrest has a fixed height that is not adjusted to fit users of different statures and bodily forms, such that the headrest cannot support the user efficiently. In addition, the headrest is fixed on and cannot be removed from the office chair, such that it is difficult to clean the headrest during a long-term utilization.

BRIEF SUMMARY OF THE INVENTION

The primary objective of the present invention is to provide a head/neck adjusting device that is mounted on an office chair to support a user's head and neck efficiently when the user is seated on the office chair.

In accordance with the present invention, there is provided an adjusting device comprising a base, a clamping member mounted on the base, a holder mounted on the base, an adjusting and fastening knob mounted on the base, a plurality of locking members mounted on the holder, and a head/neck support mounted on the locking members. The clamping member is clamped on a backrest of a chair. The clamping member is arranged at a first side of the base. The holder includes a linear adjusting member mounted on the base, and an angle adjusting member pivotally connected with the linear adjusting member. The linear adjusting member of the holder has a lengthwise bottom inserted through the base. The angle adjusting member of the holder has a bottom pivotally mounted on a top of the linear adjusting member. The adjusting and fastening knob is arranged at a second side of the base and located opposite to the clamping member. The adjusting and fastening knob extends through the base and the linear adjusting member. Each of the locking members is pivotally mounted on a top of the angle adjusting member of the holder. Each of the locking members is provided with a positioning projection. The head/neck support is provided with a plurality of support posts extending through the locking members respectively. Each of the support posts of the head/neck support is provided with a plurality of positioning holes, and the positioning projection of each of the locking members is positioned in one of the positioning holes of each of the support posts.

Preferably, the holder further includes a handle mounted on a pivotal connection of the linear adjusting member and the angle adjusting member.

Preferably, a rotary knob is mounted on a pivotal connection of a top of the angle adjusting member and each of the locking members.

Preferably, the angle adjusting member of the holder has two symmetrically arranged branches, and each of the branches of the angle adjusting member has a top pivotally connected with one of the locking members.

Preferably, the lengthwise bottom of the linear adjusting member is inserted through the base in a first direction, and the positioning holes of each of the support posts are arranged in the first direction.

Preferably, each of the support posts of the head/neck support has a lengthwise direction parallel with the first direction. The support posts of the head/neck support are parallel with each other in the lengthwise direction. The support posts of the head/neck support are distant from each other with a distance in a second direction which is perpendicular to the first direction.

The adjusting device further comprises a covering layer mounted on the head/neck support and located opposite to the locking members. Preferably, the covering layer is made of a sponge or net-shaped cloth.

According to the primary advantage of the present invention, the head/neck support is moved relative to the backrest of the chair, so as to adjusted the height of the head/neck support according to the user's requirement, such that the head/neck support supports the user's head and neck completely, and provides a comfortable sensation to the user.

According to another advantage of the present invention, the head/neck support has a multi joint pivotal structure to achieve multiple adjusting angles by provision of the handle and the rotary knob, so as to fit the user's requirement.

According to a further advantage of the present invention, the head/neck adjusting device is attached to the chair by directly snapping the clamping member onto the backrest of the chair, such that the head/neck adjusting device is mounted on the chair easily and quickly, thereby facilitating the user mounting the head/neck adjusting device.

According to a further advantage of the present invention, the head/neck adjusting device is detached from the chair by directly removing the clamping member from the backrest of the chair, such that the head/neck adjusting device is detached from the chair easily and quickly, thereby facilitating the user removing the head/neck adjusting device.

According to a further advantage of the present invention, the head/neck adjusting device is detached easily and quickly, such that the user clears the head/neck adjusting device easily and conveniently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
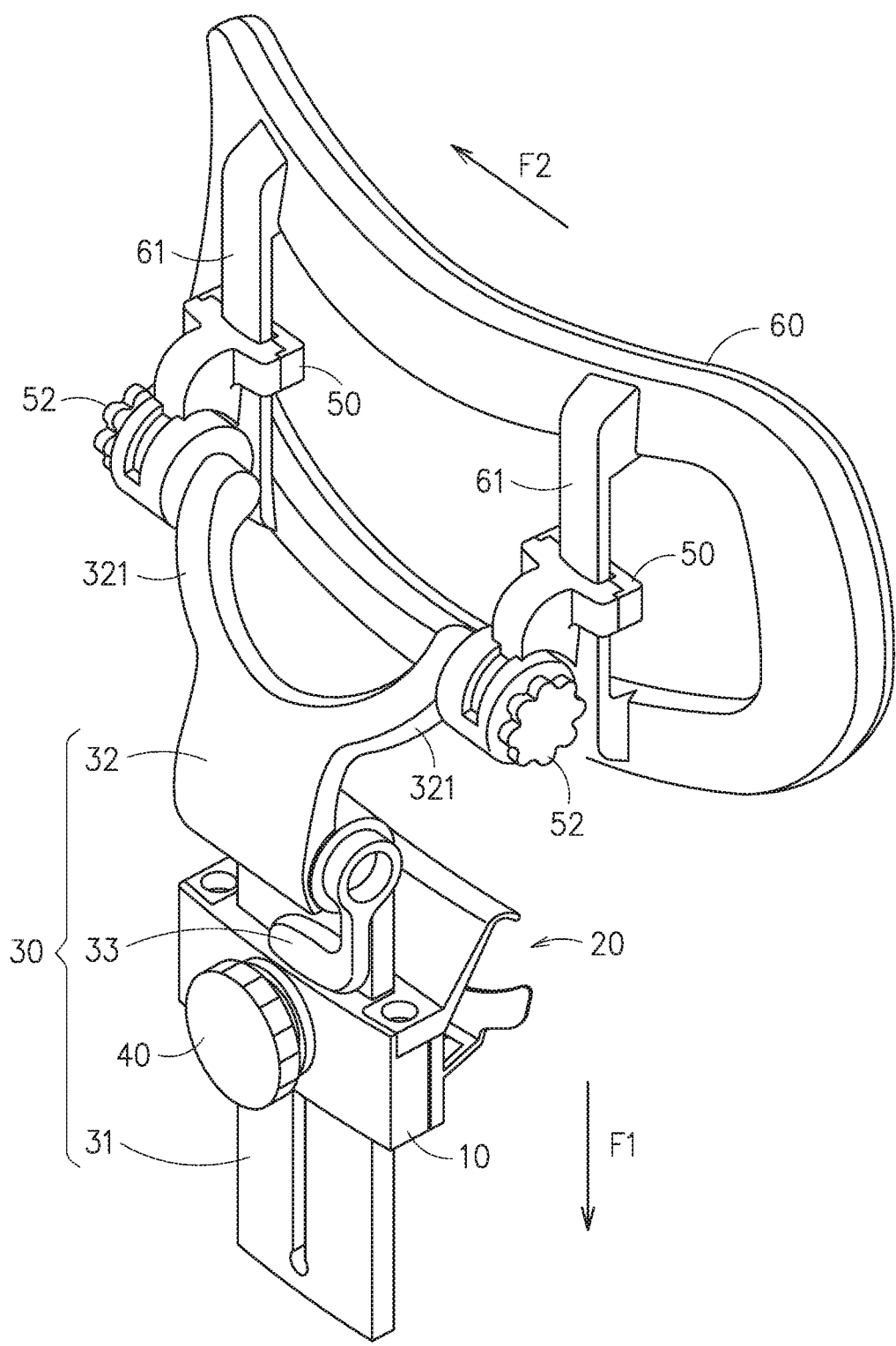
FIG. 1 is a perspective view of an adjusting device for a chair in accordance with the preferred embodiment of the present invention.

Referring to the drawings and initially to FIGS. 1-4, a head/neck adjusting device 1 for a chair 70 in accordance with the preferred embodiment of the present invention comprises a base 10, a clamping member 20 mounted on the base 10, a holder 30 mounted on the base 10, an adjusting and fastening knob 40 mounted on the base 10, a plurality of locking members 50 mounted on the holder 30, and a head/neck (or occiput) support 60 mounted on the locking members 50.

The clamping member 20 is clamped on a backrest 71 of a chair 70. The clamping member 20 is arranged at a first side of the base 10.

The holder 30 includes a linear adjusting member 31 mounted on the base 10, and an angle adjusting member 32 pivotally connected with the linear adjusting member 31. The linear adjusting member 31 of the holder 30 has a lengthwise bottom inserted through the base 10. The linear adjusting member 31 of the holder 30 is lifted or lowered relative to the base 10, to adjust the height of the angle adjusting member 32. The angle adjusting member 32 of the holder 30 has a bottom pivotally mounted on a top of the linear adjusting member 31.

The adjusting and fastening knob 40 is arranged at a second side of the base 10 and located opposite to the clamping member 20. The adjusting and fastening knob 40 extends through the base 10 and the linear adjusting member 31 to releasably secure the linear adjusting member 31 to the base 10.

Each of the locking members 50 is pivotally mounted on a top of the angle adjusting member 32 of the holder 30. Each of the locking members 50 is provided with a positioning projection 51.

The head/neck support 60 is provided with a plurality of support posts 61 extending through the locking members 50 respectively. Each of the support posts 61 of the head/neck support 60 is provided with a plurality of positioning holes 62, and the positioning projection 51 of each of the locking members 50 is positioned (or locked) in one of the positioning holes 62 of each of the support posts 61.

In the preferred embodiment of the present invention, the holder 30 further includes a handle 33 mounted on a pivotal connection of the linear adjusting member 31 and the angle adjusting member 32.

In the preferred embodiment of the present invention, a rotary knob 52 is mounted on a pivotal connection of a top of the angle adjusting member 32 and each of the locking members 50.

In the preferred embodiment of the present invention, the angle adjusting member 32 of the holder 30 has a bifurcate or fork shape and has two symmetrically arranged branches 321, and each of the branches 321 of the angle adjusting member 32 has a top pivotally connected with one of the locking members 50.

In the preferred embodiment of the present invention, the lengthwise bottom of the linear adjusting member 31 is inserted through the base 10 in a first direction "F1", and the positioning holes 62 of each of the support posts 61 are arranged in the first direction "F 1".

In the preferred embodiment of the present invention, each of the support posts 61 of the head/neck support 60 has a lengthwise direction parallel with the first direction "F1". The support posts 61 of the head/neck support 60 are parallel with each other in the lengthwise direction. The support posts 61 of the head/neck support 60 are distant from each other with a distance in a second direction "F2" which is perpendicular to the first direction "F1".

Figure 2:
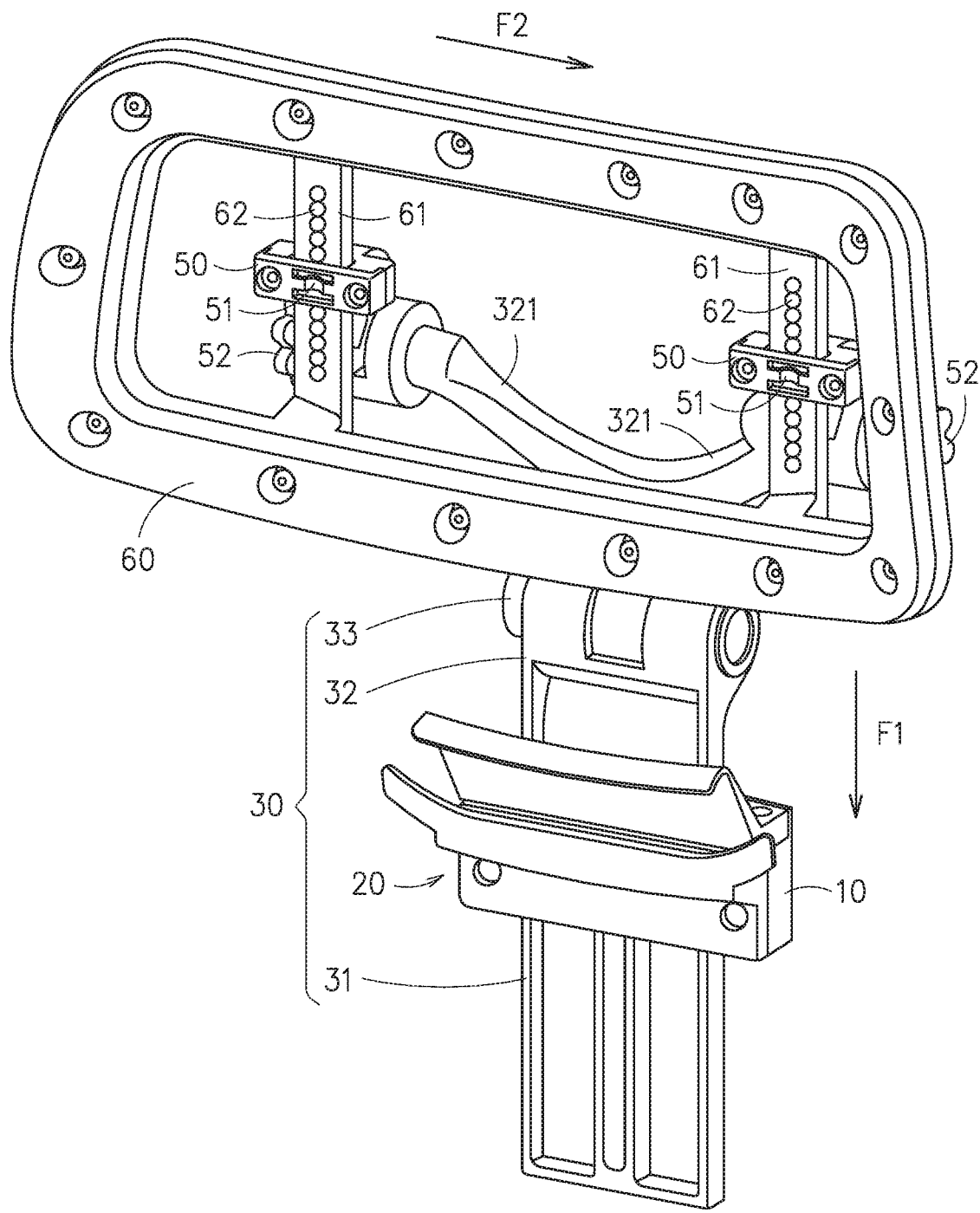
FIG. 2 is another perspective view of the adjusting device for a chair in accordance with the preferred embodiment of the present invention.
Figure 3:
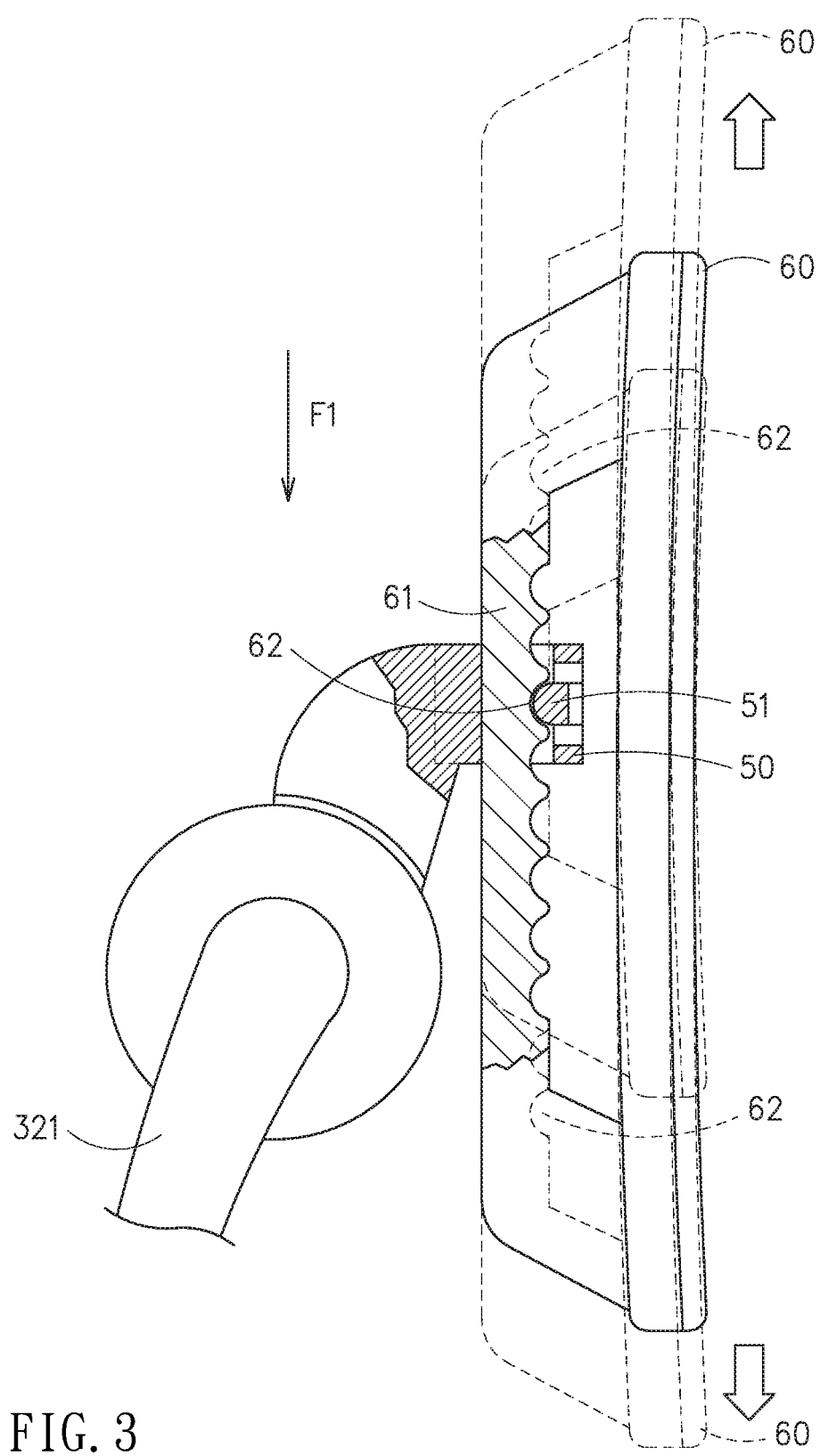
FIG. 3 is a side cross-sectional operational view of the adjusting device for a chair as shown in FIG. 1, wherein the height of the head/neck support is adjusted.
Figure 4:
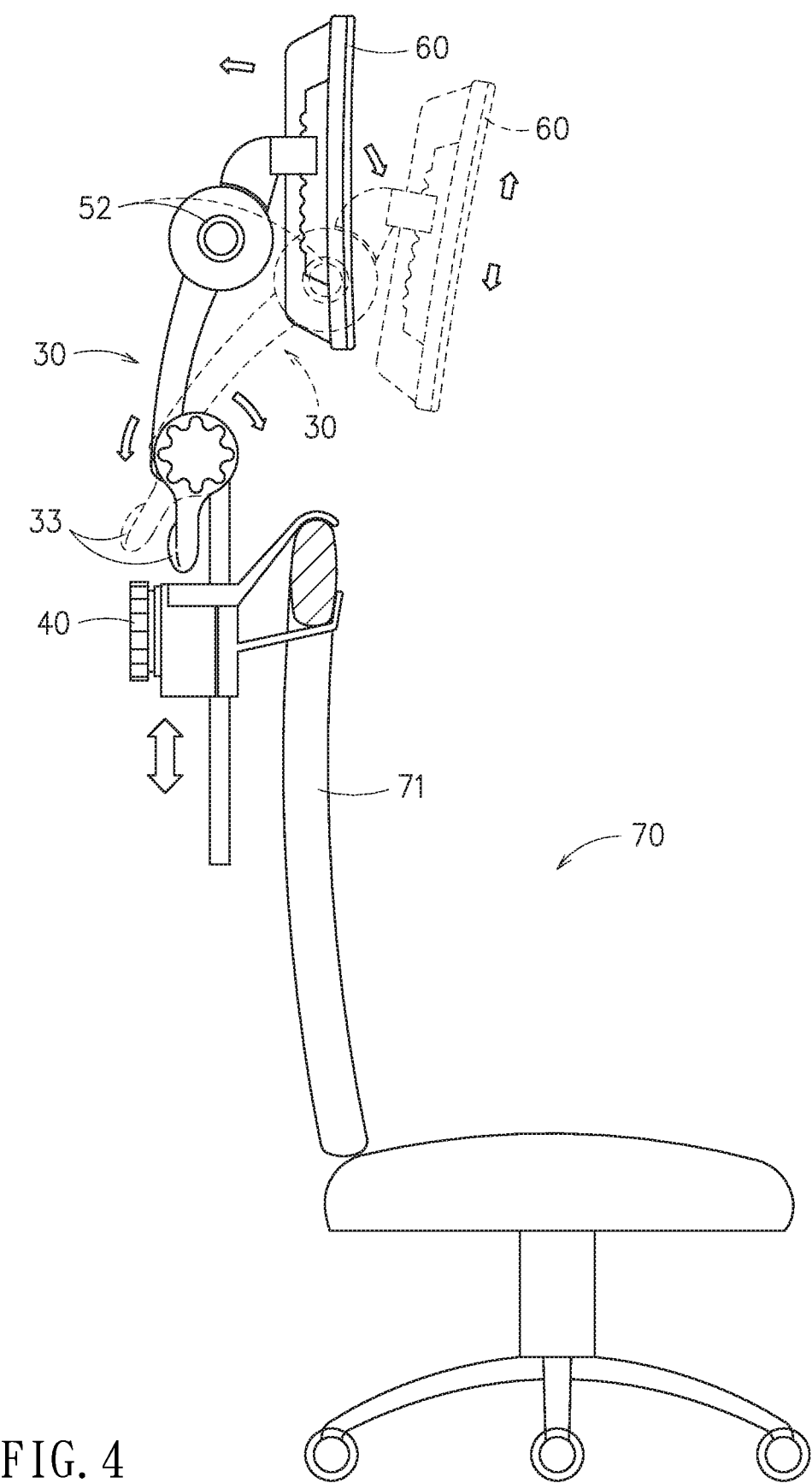
FIG. 4 is a schematic side operational view of the adjusting device for a chair as shown in FIG. 1, wherein the angle and height of the head/neck support is adjusted.

In operation, referring to FIGS. 3 and 4 with reference to FIGS. 1 and 2, the clamping member 20 is clamped on the top of the backrest 71 of the chair 70 to attach the head/neck adjusting device 1 to the backrest 71 of the chair 70. In such a manner, the adjusting and fastening knob 40 is rotated to unlock the linear adjusting member 31 of the holder 30 from the base 10, such that the linear adjusting member 31 of the holder 30 is moved relative to the base 10 as shown in FIG. 4, so as to adjust the height of the holder 30 and the head/neck support 60. In addition, the angle adjusting member 32 of the holder 30 is pivoted relative to the linear adjusting member 31 by operation and control of the handle 33 as shown in FIG. 4, so as to adjusted the angle of the holder 30 and the head/neck support 60. In addition, the locking members 50 are pivoted relative to the angle adjusting member 32 of the holder 30 by operation and control of the rotary knob 52 as shown in FIG. 4, so as to adjusted the angle of the head/neck support 60. In addition, the support posts 61 are moved upward or downward relative to the locking members 50 respectively as shown in FIG. 3, so as to adjusted the height of the head/neck support 60. At this time, the positioning projection 51 of each of the locking members 50 is positioned in one of the positioning holes 62 of each of the support posts 61.

Accordingly, the head/neck support 60 is moved relative to the backrest 71 of the chair 70, so as to adjusted the height of the head/neck support 60 according to the user's requirement, such that the head/neck support 60 supports the user's head and neck completely, and provides a comfortable sensation to the user. In addition, the head/neck support 60 has a multi joint pivotal structure to achieve multiple adjusting angles by provision of the handle 33 and the rotary knob 52, so as to fit the user's requirement. Further, the head/neck adjusting device 1 is attached to the chair 70 by directly snapping the clamping member 20 onto the backrest 71 of the chair 70, such that the head/neck adjusting device 1 is mounted on the chair 70 easily and quickly, thereby facilitating the user mounting the head/neck adjusting device 1. Further, the head/neck adjusting device 1 is detached from the chair 70 by directly removing the clamping member 20 from the backrest 71 of the chair 70, such that the head/neck adjusting device 1 is detached from the chair 70 easily and quickly, thereby facilitating the user removing the head/neck adjusting device 1. Further, the head/neck adjusting device 1 is detached easily and quickly, such that the user clears the head/neck adjusting device 1 easily and conveniently.

Figure 5:
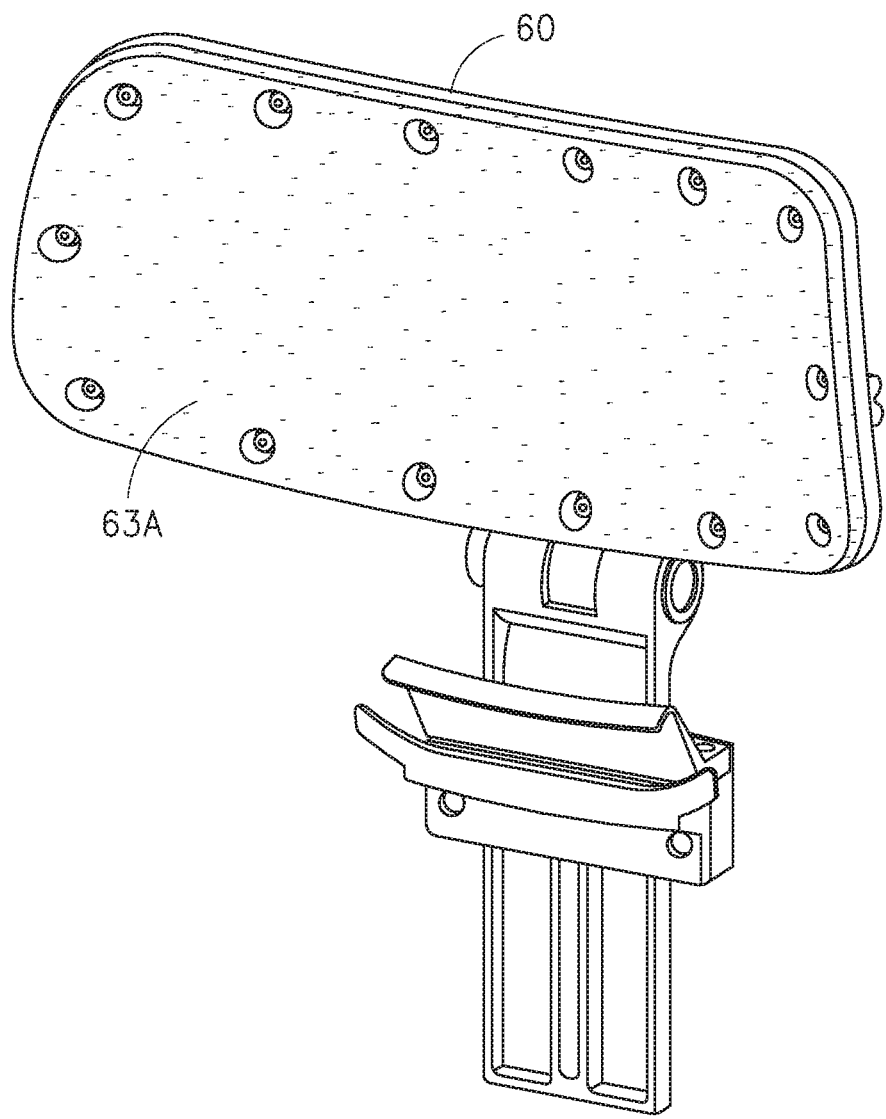
FIG. 5 is a perspective view of the adjusting device for a chair in accordance with another preferred embodiment of the present invention.

Referring to FIG. 5, the head/neck adjusting device 1 further comprises a covering layer 63A mounted on the head/neck support 60 and located opposite to the locking members 50. Preferably, the covering layer 63A is made of a sponge.

Figure 6:
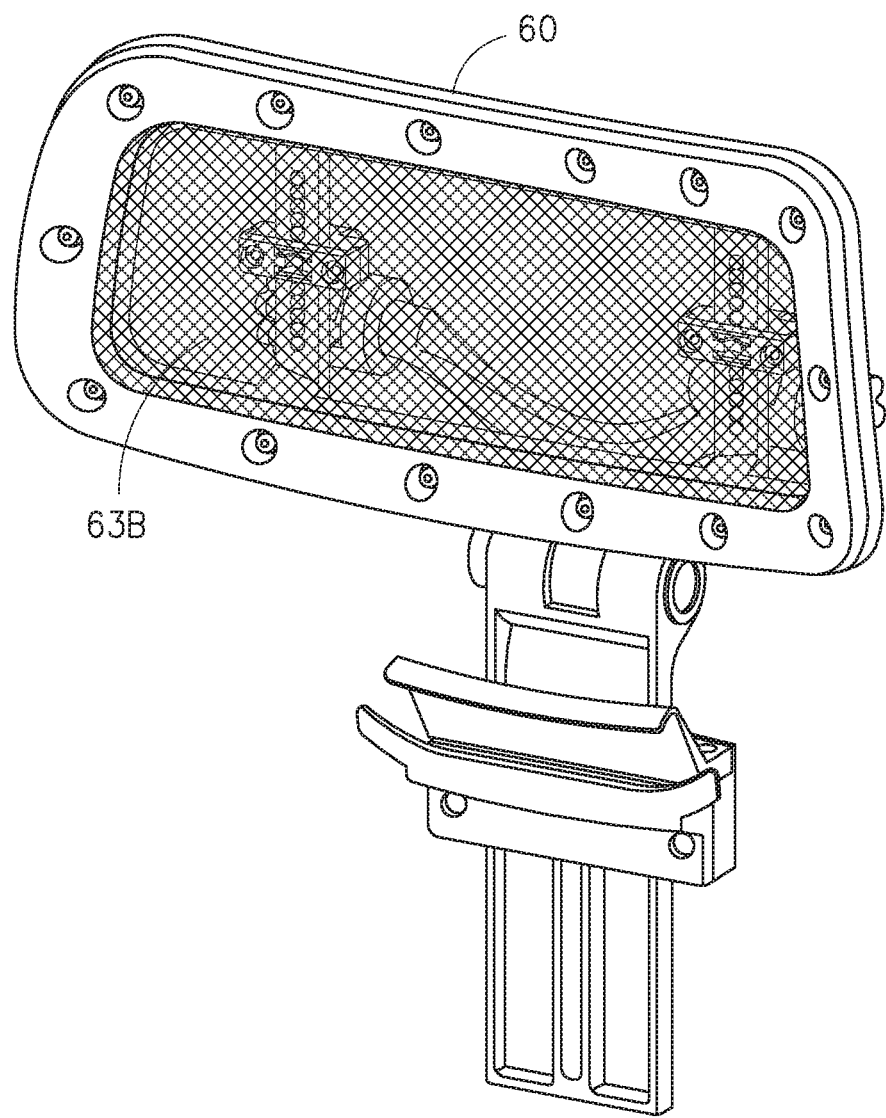
FIG. 6 is a perspective view of the adjusting device for a chair in accordance with a further preferred embodiment of the present invention.

Referring to FIG. 6, the covering layer 63B is made of net-shaped cloth.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An adjusting device comprising:
   a base;
   a clamping member mounted on the base;
   a holder mounted on the base;
   an adjusting and fastening knob mounted on the base;
   a plurality of locking members mounted on the holder; and
   a head/neck support mounted on the locking members;
   wherein:
   the clamping member is clamped on a backrest of a chair;
   the clamping member is arranged at a first side of the base;
   the holder includes a linear adjusting member mounted on the base, and an angle adjusting member pivotally connected with the linear adjusting member;
   the linear adjusting member of the holder has a lengthwise bottom inserted through the base;
   the angle adjusting member of the holder has a bottom pivotally mounted on a top of the linear adjusting member;
   the adjusting and fastening knob is arranged at a second side of the base and located opposite to the clamping member;
   the adjusting and fastening knob extends through the base and the linear adjusting member;
   each of the locking members is pivotally mounted on a top of the angle adjusting member of the holder;
   each of the locking members is provided with a positioning projection;
   the head/neck support is provided with a plurality of support posts extending through the locking members respectively;
   each of the support posts of the head/neck support is provided with a plurality of positioning holes; and
   the positioning projection of each of the locking members is positioned in one of the positioning holes of each of the support posts.

2. The adjusting device of claim 1, wherein the holder further includes a handle mounted on a pivotal connection of the linear adjusting member and the angle adjusting member.

3. The adjusting device of claim 1, wherein a rotary knob is mounted on a pivotal connection of a top of the angle adjusting member and each of the locking members.

4. The adjusting device of claim 1, wherein the angle adjusting member of the holder has two symmetrically arranged branches, and each of the branches of the angle adjusting member has a top pivotally connected with one of the locking members.

5. The adjusting device of claim 1, wherein the lengthwise bottom of the linear adjusting member is inserted through the base in a first direction, and the positioning holes of each of the support posts are arranged in the first direction.

6. The adjusting device of claim 5, wherein:
   each of the support posts of the head/neck support has a lengthwise direction parallel with the first direction;
   the support posts of the head/neck support are parallel with each other in the lengthwise direction; and
   the support posts of the head/neck support are distant from each other with a distance in a second direction which is perpendicular to the first direction.

7. The adjusting device of claim 1, further comprising:
   a covering layer mounted on the head/neck support and located opposite to the locking members;
   wherein the covering layer is made of a sponge or net-shaped cloth.

* * * * *